(12) United States Patent
Komatsu (10) Patent No.: US 11,703,123 B1
(45) Date of Patent: Jul. 18, 2023

(54) DRIVELINE COMPONENT WITH ACTUATOR SPRING

(71) Applicant: GKN Automotive Limited, Birmingham (GB)

(72) Inventor: Toshiaki Komatsu, Commerce Township, MI (US)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/715,514

(22) Filed: Apr. 7, 2022

(51) Int. Cl.
| | |
|---|---|
| *F16H 63/30* | (2006.01) |
| *F16H 48/06* | (2006.01) |
| *F16H 48/40* | (2012.01) |
| *F16H 48/24* | (2006.01) |

(52) U.S. Cl.
CPC .......... *F16H 63/304* (2013.01); *F16H 48/06* (2013.01); *F16H 48/40* (2013.01); *F16H 48/24* (2013.01); *F16H 2048/405* (2013.01)

(58) Field of Classification Search
CPC ........ F16H 63/304; F16H 48/24; F16H 48/34; F16H 2048/346; F16D 2121/20; F16D 2125/582; B60K 23/08; B60K 2023/085; B60K 2023/0858
USPC ................................................. 475/240, 241
See application file for complete search history.

(56) References Cited

U.S. PATENT DOCUMENTS

| | | | |
|---|---|---|---|
| 2,778,245 A * | 1/1957 | Thornton | ................ F16H 48/24 475/241 |
| 3,233,497 A | 2/1966 | McCormick | |
| 3,666,219 A | 5/1972 | Baus | |
| 3,973,450 A * | 8/1976 | Shealy | ..................... F16H 48/08 475/86 |
| 4,752,178 A | 6/1988 | Greenhill | |
| 5,098,360 A * | 3/1992 | Hirota | ..................... F16H 48/24 475/237 |
| 6,007,449 A * | 12/1999 | Okada | ..................... F16H 48/30 74/650 |
| 6,827,663 B2 * | 12/2004 | Tucker-Peake | ......... F16H 48/34 475/233 |
| 7,399,248 B2 | 7/2008 | Kleinhans et al. | |
| 7,775,928 B2 * | 8/2010 | Zink | ..................... B60K 17/16 475/230 |

(Continued)

FOREIGN PATENT DOCUMENTS

| | | | | |
|---|---|---|---|---|
| DE | 102005027939 A1 * | 1/2006 | ............ | F16D 27/118 |
| GB | 2313885 A * | 12/1997 | ............ | B60T 13/745 |

(Continued)

*Primary Examiner* — Sherry L Estremsky
(74) *Attorney, Agent, or Firm* — Reising Ethington P.C.

(57) ABSTRACT

A driveline component includes a housing, a first rotating component and a second rotating component, an actuator and a biasing component. The actuator has a body coupled to the first rotating component, the actuator drives the body relative to the second rotating component, and the body is movable between a first position in which the body is not coupled with the second rotating component and a second position in which the body is coupled with the second rotating component. The biasing component has a retainer and a spring, the retainer is in contact with a stop surface that limits movement of the retainer, the spring is fixed to the retainer on one side of the spring and the spring is contacted by the body during at least a portion of the movement of the body to provide a biasing force on the body.

13 Claims, 4 Drawing Sheets

(56) References Cited

U.S. PATENT DOCUMENTS

| | | | |
|---|---|---|---|
| 7,892,134 B2* | 2/2011 | Fusegi | ................... F16H 48/34 |
| | | | 475/235 |
| 9,429,179 B2 | 8/2016 | Tran | |
| 10,054,173 B2* | 8/2018 | Rippelmeyer | ...... F16D 25/0638 |
| 10,118,486 B2 | 11/2018 | Oram et al. | |
| 10,308,113 B2* | 6/2019 | Inose | ................... B60K 17/165 |
| 10,870,347 B2* | 12/2020 | Saieg | ................... F16D 27/118 |
| 2007/0037655 A1* | 2/2007 | Salg | ........................ F16H 48/24 |
| | | | 475/237 |

FOREIGN PATENT DOCUMENTS

| | | | | |
|---|---|---|---|---|
| JP | 2007303494 A | | 11/2007 | |
| JP | 2007315583 A | * | 12/2007 | ............. F16H 48/08 |
| JP | 2008057692 A | | 3/2008 | |
| JP | 2017211017 A | * | 11/2017 | ............. B60K 17/02 |
| WO | WO-8605850 A1 | * | 10/1986 | |

\* cited by examiner

DRIVELINE COMPONENT WITH ACTUATOR SPRING

TECHNICAL FIELD

The present disclosure relates generally to a driveline component having an actuator, like a clutch, with a spring.

BACKGROUND

A vehicle driveline transfers motive power to vehicle wheels. Various driveline components are known. For example, power transfer units are commonly utilized in front-wheel drive based all-wheel drive systems. Power transfer units may include a disconnect device so that power is transferred to only the front wheels during certain vehicle operating conditions and to more and up to all wheels in other vehicle operating conditions.

Vehicle drivelines may also include differentials that allow the wheels to spin at different rates while transmitting torque to the wheels. While this solution may be satisfactory in some driving conditions, it may be unsatisfactory under conditions where one of the driven wheels experiences a surface having a much lower coefficient of friction than a surface engaged by the other wheel(s). Such conditions may prevent the application of torque to a wheel with more traction, thereby resulting in undesired vehicle performance. A locking mechanism may be provided to lock the differential and prevent different wheel spin rates and transmit torque uniformly between two wheels in at least some circumstances.

SUMMARY

In at least some implementations, a driveline component includes a housing, a first rotating component and a second rotating component, an actuator and a biasing component. The actuator has a body coupled to the first rotating component, the actuator drives the body relative to the second rotating component, and the body is movable between a first position in which the body is not coupled with the second rotating component and a second position in which the body is coupled with the second rotating component. The biasing component has a retainer and a spring, the retainer is in contact with a stop surface that limits movement of the retainer, the spring is fixed to the retainer on one side of the spring and the spring is contacted by the body during at least a portion of the movement of the body to provide a biasing force on the body.

In at least some implementations, the actuator drives the body from the first position to the second position and the spring provides a force on the body tending to move the body from the second position to the first position. Of course, other arrangements may be used.

In at least some implementations, the spring is annular and has a radially inner surface and a radially outer surface, and wherein the radially inner surface and the radially outer surface are not in contact with other components of the driveline component. This may avoid interference with the movement and operation of the spring.

In at least some implementations, a housing is provided and the body and biasing component are received within the housing, and the housing includes the stop surface that contacts the retainer to maintain a position of the biasing component. In at least some implementations, the stop surface defines part of a groove in which a periphery of the retainer is received. In at least some implementations, the retainer is c-shaped and includes a gap between spaced apart ends, and the retainer is flexible to reduce the diameter of the retainer and wherein the retainer is resilient to expand when installed so that a portion of the retainer is radially overlapped by the stop surface. In at least some implementations, the retainer includes a rear face that is flat and arranged to contact the stop surface. In at least some implementations, the retainer includes a front face to which the spring is fixed to prevent movement of the spring relative to the retainer at the point or points of fixation.

In at least some implementations, the first rotating component is a differential housing and the second rotating component is a gear of the differential. The gear is then selectively coupled to the housing to selectively provide a locked differential. In at least some implementations, the differential housing includes the stop surface and wherein the body and the biasing component are received within an interior of the differential housing.

In at least some implementations, the first rotating component is a first shaft and the second rotating component is a second shaft, wherein the second shaft does not rotate with the first shaft when the body is in the first position and the second shaft does rotate with the first shaft when the body is in the second position. This may permit a different number of wheels of a vehicle to be driven in one mode than in another mode. In at least some implementations, at least part of the first shaft and at least part of the second shaft are received within a housing, and wherein the body and the biasing component are received within the housing.

In at least some implementations, the body includes teeth and the second rotating component includes complementary teeth that are meshed with the teeth of the body when the body is in the second position. Here, teeth may mean things arranged like teeth on a gear, splines, or similar spaced apart projections that may be drivingly coupled or meshed together.

In at least some implementations, the actuator includes a solenoid coil and a plunger driven by a force produced by the coil, and wherein the plunger engages a first face of the body and the spring engages an opposite second face of the body. When energized the coil produces a magnetic field that drives the plunger in one direction, and when the magnetic field subsides or is terminated, the spring drives the plunger in a second, opposite direction.

In at least some implementations, a driveline component, includes, a first rotating component and a second rotating component, a body coupled to the first rotating component, a wire coil constructed to produce a magnetic field, a plunger moved from a first position to a second position by the magnetic field, wherein movement of the plunger from the first position to the second position moves the body relative to the second rotating component from a first position in which the body is not coupled with the second rotating component and a second position in which the body is coupled with the second rotating component, and a biasing component. The biasing component has a retainer and a spring, the retainer being in contact with a stop surface to limit movement of the retainer, and the spring being fixed to the retainer on one side of the spring and the spring contacting the body during at least a portion of the movement of the body to provide a biasing force on the body in a second direction that is opposite to the first direction.

In at least some implementations, the first rotating component is a differential housing and the second rotating component is a gear, and the spring is annular and has a radially inner surface and a radially outer surface, and wherein the radially inner surface and the radially outer surface are not in contact with the differential housing or the gear.

In at least some implementations, the first rotating component is a first shaft received having a portion within a housing and the second rotating component is a second shaft having a portion within the housing, wherein the second shaft does not rotate with the first shaft when the body is in the first position and the second shaft does rotate with the first shaft when the body is in the second position. In at least some implementations, the spring is annular and has a radially inner surface and a radially outer surface, and wherein the radially inner surface and the radially outer surface are not in contact with the housing or the second shaft.

Various features and components may be combined together except where they are mutually exclusive, in accordance with the description below, which is intended to illustrate the various features rather than limit the inventions described herein.

BRIEF DESCRIPTION OF THE DRAWINGS

The following detailed description of preferred embodiments and best mode will be set forth with reference to the accompanying drawings, in which.

DETAILED DESCRIPTION

Figure 1:
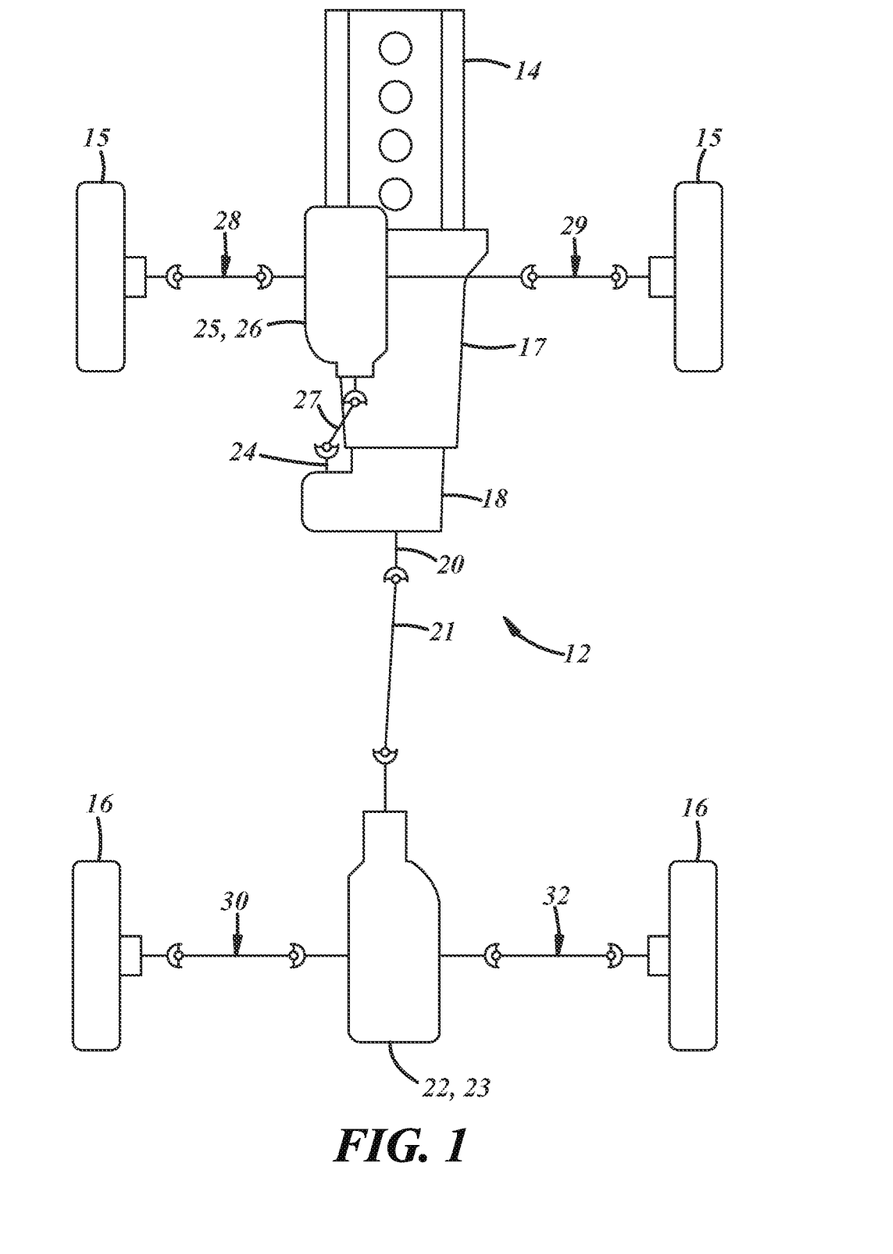
FIG. 1 is a schematic diagram of a vehicle driveline assembly.

Referring in more detail to the drawings, FIG. 1 illustrates a vehicle driveline 12 that provides power from an engine 14 to multiple wheels including front wheels 15 and rear wheels 16. The engine 14 supplies torque via a transmission 17 and a power transfer unit 18 that provides an output shaft 20. The output shaft 20 is coupled to a first prop shaft 21 which is coupled to a rear drive unit 22 that may include a differential assembly 23. The power transfer unit 18 or other device may have an output shaft 24 coupled to a front drive unit 25 (which may include a differential assembly 26) via a second prop shaft 27. Front left and right side shafts 28, 29 are coupled to the drive unit/differential 25, 26 which permits relative rotation between the side shafts 28, 29 and front wheels 15. Rear left and right side shafts 30, 32 are coupled to the rear drive unit/differential 22, 23 which permits relative rotation between the side shafts 30, 32 and rear wheels 16. The power transfer unit 18 may include a disconnect assembly that, when in a connected state, transfers torque to the second prop shaft 27 to drive the front wheels 15. When connected or disconnected, the power transfer unit 18 may provide torque to the first prop shaft 21 to drive the rear wheels 16. Thus, depending upon the state of the disconnect device, the driveline 12 may provide torque to the rear wheels 16 only or to all four of the wheels 15, 16.

Of course, other driveline configurations and driveline components may be used, as desired. For example, while shown in rear drive based driveline, lockup differentials can also be used in front based all-wheel drive system, or even in two-wheel drive front engine/front wheel drive or front engine/rear wheel drive drivetrains, as well as in an e-axle (e-motor driven final drive unit).

Figure 2:
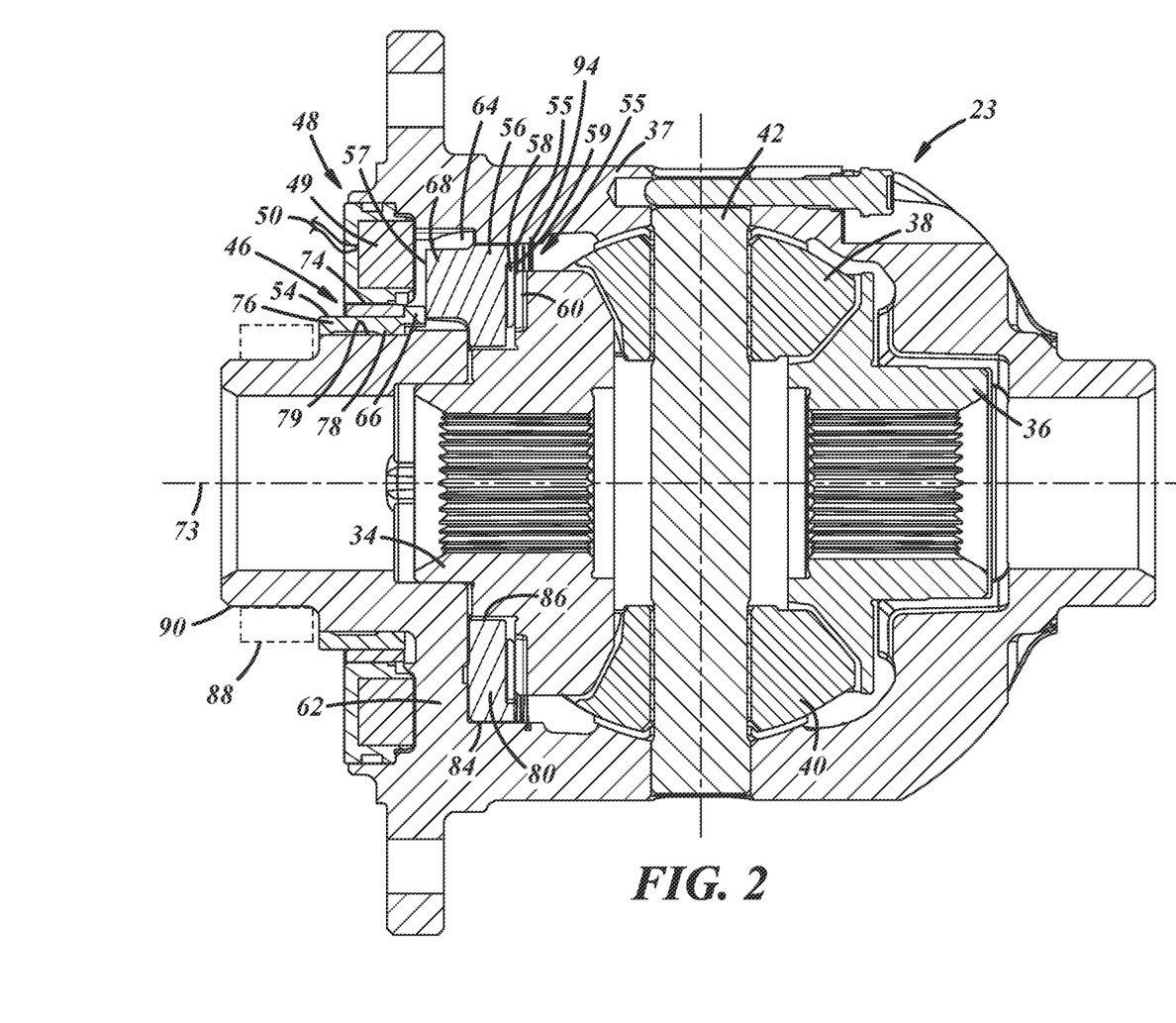
FIG. 2 is a cross-sectional view of a differential with an electrically actuated clutch, wherein the differential is shown in an open position.

Referring now to FIG. 2, the first rear side shaft 30 is connected to a first side gear 34 within the differential 23. Similarly, the second rear side shaft 32 is connected to a second side gear 36 within the differential 23. The side gears 34, 36 are carried within a housing 37 of the differential 23 (which may be called a differential housing or device housing). The differential also includes pinion gears 38, 40 that are meshed with side gears 34, 36, respectively, and which are mounted within the housing 37 on a pinion shaft 42.

To selectively lock and unlock the differential 23 a clutch assembly 46 is provided. The clutch assembly 46 may have actuated and deactuated states, and in one state the clutch assembly couples one of the side shafts (e.g. 32) to the differential housing 37 so that the coupled side shaft rotates with the housing. This, in turn, causes the other side shaft 30 to rotate in unison with the housing 37 and the side shaft 32 coupled to the housing so that both side shafts 30, 32 rotate at the same speed.

In at least some implementations, the clutch assembly 46 is electrically actuated and includes an actuator having a solenoid 48 with an annular wire coil 49 and a drive member that may include an armature or plunger 54 received at least partially radially inwardly of and axially overlapped with the coil. In at least some implementations, the plunger 54 is also annular, the plunger and coil 49 are coaxially arranged and carried by the housing 37 for rotation with the housing, and one side shaft (here, the second side shaft 32) extends coaxially through a portion of the housing 37 that extends through the coil and plunger. Electric power is supplied to the coil 49 via a power wire 50 to generate a magnetic field that displaces the plunger 54 relative to the coil and differential housing 37 from a first or retracted position to a second or advanced position. To facilitate return of the plunger 54 from the second position back to the first position when power is not provided to the coil 49, a biasing member, such as a spring 55 may act on the plunger 54, or on a component engaged with the plunger, as set forth below. In at least some implementations, the clutch assembly 46 is actuated when the plunger 54 is in the second position and the clutch assembly is deactuated when the plunger is in the first position. While in the example shown the plunger 54 is in its second position when power is provided to the coil 49 and the plunger moves to the first position when power is not supplied to the coil, the opposite could be true if desired (e.g. the clutch assembly 46 could be moved to the actuated position by the biasing member 55 and deactuated by powering the coil).

In at least some implementations, the clutch assembly 46 may further include or be associated with a coupling body or clutch member, called herein a clutch ring 56 adapted to be driven by the plunger 54 and to interface with the side gear 34 as set forth below. The clutch ring 56 may be annular and a portion of the second side gear 36 and/or shaft 32 may extend through the clutch ring. The clutch ring 56 may include a rear face 57 engageable by the plunger 54 and a front face 59 having at least one engagement feature 58, such as gear or clutch teeth 58 (e.g. dog clutch teeth) configured to engage a corresponding engagement feature 60 (e.g. gear or dog clutch teeth) formed on a rear face of the first side gear 34. The spring 55 may act on the clutch ring 56 to urge the clutch ring into the plunger 54 and move the plunger to its first position when the coil 49 is not powered, as noted above. In the implementation shown, the plunger 54 is located adjacent to one side of a housing wall 62 and the clutch ring 56 is located adjacent to the other side of the wall 62. The wall 62 includes apertures 64, and the plunger 54 and clutch ring 56 include axially extending feet 66, 68, respectively, that extend into or through the apertures 64 in the wall so that the plunger and clutch ring are engaged with each other across or through the wall. Like the coil 49 and plunger 54, the clutch ring 56 also is carried by and rotates with the housing 37.

The differential 23 illustrated in FIG. 2 is shown in an open mode or position. In the illustrated implementation, in the open position of the differential, the coil 49 is not powered, the plunger 54 is in its first position and the clutch ring 56 is not engaged with the side gear 34 so that the side gear can rotate relative to the clutch ring 56 and housing 37. In the open position, the side shafts 30, 32 may rotate at different speeds from one another. However, certain driving conditions may make it desirable for the side shafts 30, 32 to rotate in unison such that torque is applied to both wheels.

In the locked position, the coil 49 is powered, the plunger 54 is advanced to its second position which drives the clutch ring 56 into engagement with the side gear 34 (i.e. teeth 58 engage and mesh with teeth 60). Hence, the side gear 34 is coupled to the housing 37 so that the side gear rotates with and not relative to the housing. In effect, the second side shaft 32 is locked to and rotates with the housing 37, which in turn forces the first side shaft 30 and the second side shaft 32 to rotate in unison.

As shown in FIGS. 2, 3, 5 and 6, the plunger 54 may be formed from multiple materials including a material that is magnetically responsive to the magnetic field generated by the coil 49, and at least one other material that may or might not be responsive to the magnetic field. Thus, when the magnetic field is generated by the coil 49, the plunger 54 may be driven from one position to another (e.g. from the retracted to the advanced position). As used herein, a material is responsive to a magnetic field if a magnetic field of the magnitude generated by a solenoid 48 of the type used in applications such as that described herein, may cause a component formed of or including such material to be displaced.

Figure 3:
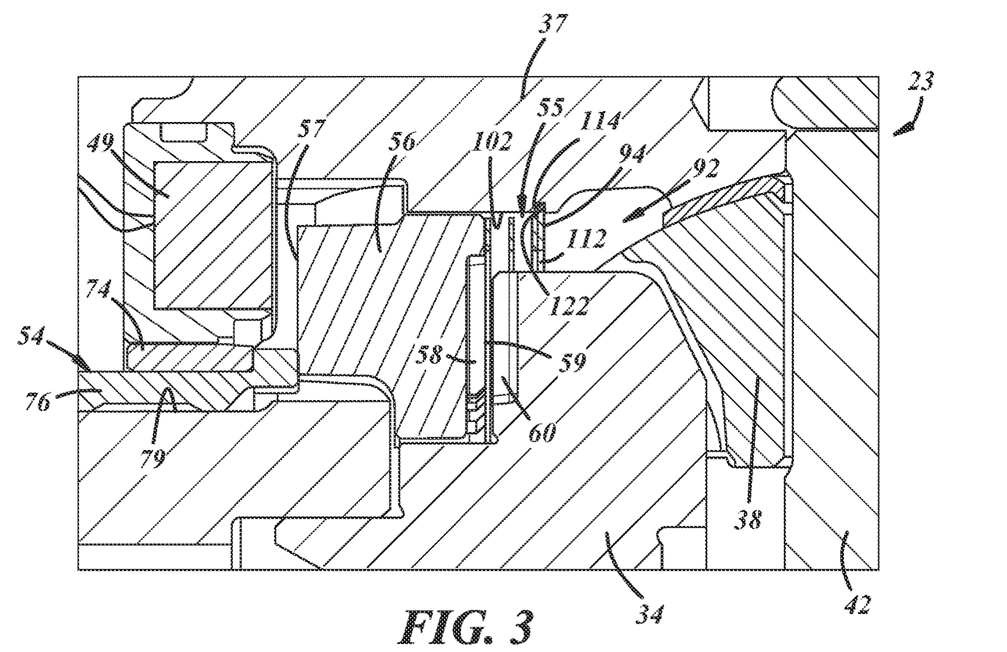
FIG. 3 is a fragmentary sectional view of a portion of FIG. 2.

In at least some implementations, as shown in FIGS. 2 and 3, the plunger 54 includes a main body with a central axis 73 and which may be defined by a first body 74 and a second body 76 that are coupled together and move as one unit or component and are not separated during use. The first body 74 may be formed from a magnetically responsive material and may be received adjacent to and radially inwardly of the coil 49, with a small air gap between them. The second body 76 may have at least a portion that is radially inward of at least a portion of the first body 74. The second body 76 may be annular and may, in at least some implementations, radially overlap part of the first body 74. The second body 76 may be conveniently overmolded onto the first body 74 to facilitate forming the second body and connecting together the first and second bodies, however other forming processes such as but not limited to casting, stamping or extruding may be used. The second body 76 may define part or all of the feet 66 of the plunger 54 which may extend axially beyond the first body 74, if desired. The second body 76 may be formed from a material that is not magnetically responsive (e.g. plastic, aluminum, stainless steel, etc.), and may provide a magnetic flux shield of sorts that improves the magnetic field strength on or in the area of the first body 74 to ensure proper response of the plunger 54 when the coil 49 is energized. In this way, the magnetic field is more concentrated or stronger in the area of the first body 74 to increase the magnetic flux at or in the first body and improve the responsiveness of the plunger 54 to the generated magnetic field.

As shown in FIGS. 2 and 3, the second body 76 may have an inner surface 78 that is received adjacent to or around a surface 79 of the differential housing 37. The inner surface 78 may define a pilot diameter for receipt of the plunger 54 over the annular surface 79 of the differential housing 37 for guided linear, axial movement of the plunger relative to the differential housing.

Referring to FIG. 2, the clutch ring 56 has a main body 80 with a central axis that may be coaxial with the axis 73 of the plunger 54, a radially outer surface 84 that extends axially between the rear face 57 and the front face 59, and a radially inner surface 86 that may have a lesser axial extent than the outer surface 84. The inner surface 86 of the clutch ring 56 may be received around a surface of the side gear 34. The feet 68 of the clutch ring 56 define part of the rear face 57, are circumferentially spaced apart and extend axially from other portions of the rear face 57. The teeth 58 are located on the front face 59. The clutch ring 56 may be made from metal, such as alloy steel, chromium steel, chromium molybdenum steel, nickel steel, nickel chromium molybdenum steel, mid/high carbon steel, etc.

In use of the differential 23, a bearing 88 is mounted on an exterior surface of a tubular portion 90 of the housing 37. In FIG. 2, the bearing 88 is shown in diagrammatic form as a broken line polygon, and may include an inner race having an inner surface on a tubular outer surface of the tubular portion, and an outer race received over the inner race. Suitable bearings are known in the art. As is shown in FIG. 2, the bearing 88 extends radially beyond the surface 79 along with the plunger 54 slides in use. The plunger 54 may be prevented from sliding off the housing 37 by engagement with the bearing 88.

Figure 4:
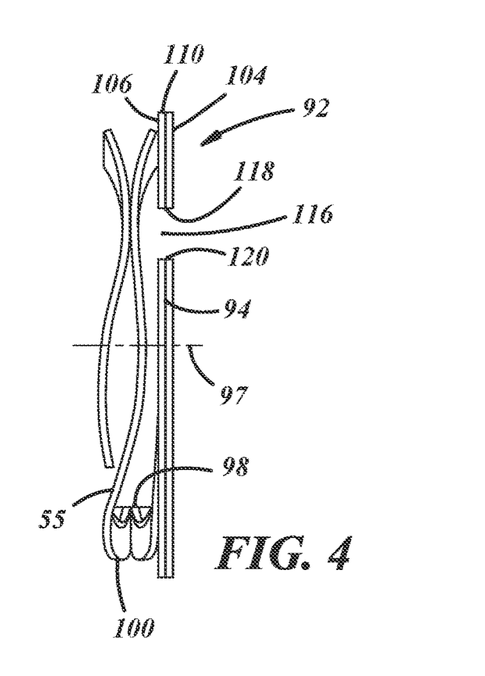
FIG. 4 is a side view of a biasing component including a retainer and a spring.
Figure 5:
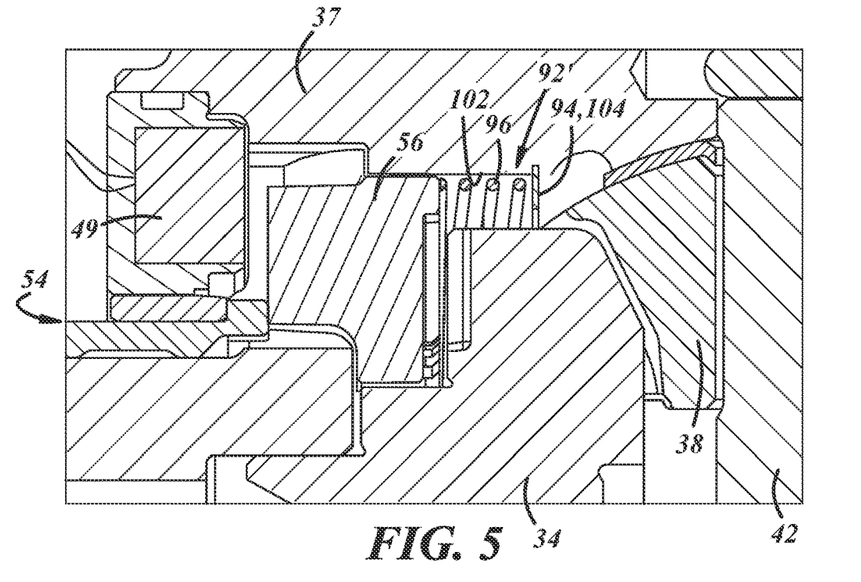
FIG. 5 is a view similar to FIG. 3 showing a different biasing component having a different type of spring.

As shown in FIGS. 3 and 4, the spring 55 is part of a biasing component 92 that includes a retainer 94 and the spring 55. The spring 55 may be of any desired type suitable for use in the differential or other device. FIGS. 3 and 4 illustrate a wave spring 55 and FIG. 5 illustrates a biasing component 92' having a coil spring 96 fixed to the retainer 94', although any annular spring may be used, including without limitation, blade springs (having multiple fingers or blades cantilevered to a body), disc springs, Belleville springs, and diaphragm springs. The spring 55 is annular, has a center axis 97 and has a plurality of elements having a radially inner surface 98 and a radially outer surface 100. The elements of the wave spring 55 have waves in each turn and the elements of the coil spring 96 are the individual coils or turns. In the examples shown, the springs 55, 96 are received between a radially outer surface of the side gear 34 and an inner surface 102 of the differential housing 37 that defines part of an interior of the housing 37 in which the gears and other components are received. The remainder of the description primarily will be set forth with regard to spring 55 but is applicable to the coil spring 96 or other springs as well.

In at least some implementations, the inner surfaces 98 of the spring elements are spaced from the side gear 34 and the outer surfaces 100 of the spring elements are spaced from the adjacent inner surface 102 of the housing 37. This may prevent binding of the spring 55 against a surface, or other interference that may inhibit or impair operation of the spring. To maintain the position of the spring 55, the spring is connected to the retainer 94.

The retainer 94 may also be annular although the retainer 94 could be c-shaped, as shown in FIG. 4, or comprised of discrete segments that are each connected to the spring 55 and thus, retained as a unit. In at least some implementations, the retainer 94 includes a flat rear face 104 and an opposite forward face 106 to which a first or inward side or end of the spring 55 is connected. In the case of a wave spring, the spring 55 may contact and be fixed to the forward face 106 of the retainer 94 at one or more peaks of the waves in a first turn of the spring 55. In the case of a coil spring 96, part or all of a first turn of the coil may contact and be fixed to the forward face 106 of the retainer 94. The spring 55 may be fixed to the retainer 94 at one or more points or areas to prevent movement of the spring 55 relative to the retainer 94 at the point or points of fixation. The spring 55 may be fixed to the retainer 94 by a weld, fastener, adhesive, rivet, crimp or staking, or the like. In at least some implementations, the spring may be formed integrally with the retainer 94 by which they are different features or portions of the same piece of material. When connected or formed in one-piece, the spring 55 is not separate from and in at least some implementations, the entirety of the spring 55 does not move relative to the retainer 94. The biasing component 92 is a single unitary component with two connected parts (the retainer 94 and spring 55) that are installed into a driveline component (e.g. differential or power transfer unit) together and not separately. The retainer 94 may have a radially outer surface 110 (FIG. 4) and a radially inner surface 112 (FIG. 3). The inner surface 112 may be sized for receipt around the side gear 34, or other component, with a gap between such component and the inner surface 112.

The retainer 94 contacts another component, like the differential housing 37, so that the position of the retainer 94 is maintained, and thus, the position of the spring 55 which is fixed to the retainer 94 is maintained. In at least some implementations, the housing 37 includes a groove 114 that extends radially outwardly into the inner surface 102 of the housing 37. The groove 114 has an axial width sufficient to receive a peripheral portion of the retainer 94, and the retainer 94 has an outer diameter (at the outer surface 110) greater than the inner diameter of the housing 37 in which the groove 114 is formed. With a c-shaped retainer 94, like that shown in FIG. 4, a gap 116 is provided between spaced apart ends 118, 120 of the retainer, and the retainer 94 is formed from an at least somewhat flexible and resilient material or materials, like a metal or polymer or composite material. The gap 116 permits the retainer 94 to be compressed for receipt within the inner surface 102 and when the retainer 94 is aligned with the groove 114, the retainer resiliently returns to or toward its uncompressed state and a portion of the periphery of the retainer is received in the groove. The retainer 94 engages a sidewall 122 of the groove 114 that acts as a stop surface to limit axial movement of the retainer, and thus, of the spring 55 connected to the retainer 94. An axial outermost turn, coil or portion of the spring 55 may define an axially outer end of the spring that is thus positioned as desired relative to the clutch ring 56 (or other component to be contacted and biased by the spring).

In the implementations shown in FIGS. 3 and 5, an axially outward side or end of the spring 55 contacts the front face 59 of the clutch ring 56 at least when the clutch ring 56 is engaged with the side gear 34, and provides a force tending to push the clutch ring 56 away from the side gear 34. Thus, as the clutch ring 56 moves to mesh with the side gear 34, the spring 55 is compressed. When compressed, the spring 55 provides a force tending to move the clutch ring 56 away from the side gear 34 and toward the plunger 54, and that force may move the plunger 54 back to its first position when the solenoid coil 49 is not powered. Of course, other implementations are possible including those wherein the spring 55 acts on the clutch ring 56 to move the clutch ring 56 toward the side gear (to the engaged position), locking the differential, or where the spring 55 acts on the plunger 54 to move the plunger to either its first position or its second position and wherein the solenoid acts to move the plunger in the opposite direction of the spring. Thus, the spring 55 may be a compression spring (provides an increasing force when compressed) or an extension spring (provides an increasing force when extended).

Figure 6:
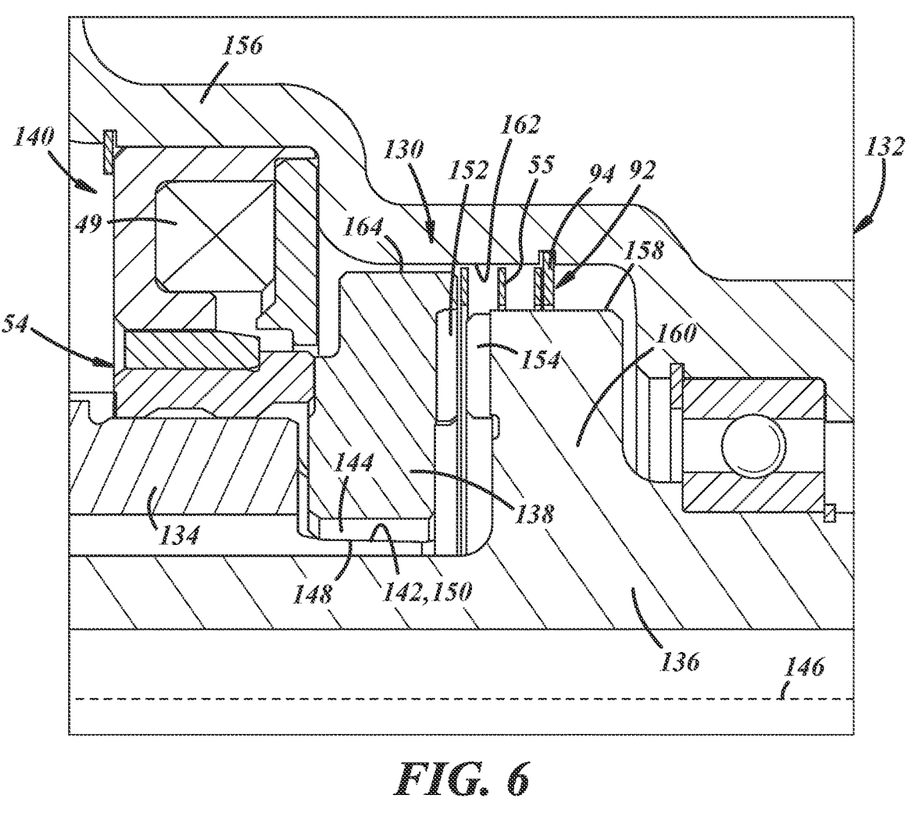
FIG. 6 is a fragmentary sectional view of a portion of a disconnect assembly in a power transfer unit, showing a portion of a first shaft, second shaft and a coupling body and actuator that drives the coupling body.

FIG. 6 illustrates an implementation wherein the biasing component 92, including the retainer 94 and spring 55, is used within a disconnect assembly 130 for a driveline component, like a power transfer unit 132. By way of non-limiting examples, the disconnect device and driveline component may be similar to that shown and described in U.S. Pat. No. 10,118,486, incorporated herein by reference. The biasing component 92 may be as described above with regard to the differential 23, including all options set forth for the biasing component. Thus, details of the biasing component 92 will not be set forth again and the description will focus on the driveline component and use of the biasing component 92 therein.

The power transfer unit 132 may include a first shaft 134, a second shaft 136, a coupling body called herein a clutch ring 138 and an actuator 140 that moves the clutch ring 138 relative to the shafts 134, 136. The actuator 140 may include the coil 49 and plunger 54 as described above, with the plunger 54 arranged to axially move the clutch ring 138 relative to the first shaft 134 and second shaft 136. The first shaft 134 may include splines or teeth 142 and the clutch ring 56 may have mated, complementary first splines or teeth 144 so that the clutch ring 138 rotates with the first shaft 134 about an axis 146, and the clutch ring 138 can slide axially relative to the first shaft 134. In at least some implementations, the clutch ring splines or teeth 144 are provided at a radially inner surface 148 of the clutch ring 56 and the first shaft splines 142 are provided at a radially outer surface 150 of the first shaft 134.

The clutch ring 138 may include a second set of splines or teeth 152 arranged to selectively mesh with complementary splines or teeth 154 on the second shaft 136. When the second set of splines 152 are meshed with the second shaft splines 154, the second shaft 136 is rotatably coupled to and rotates with the first shaft 134 and the clutch ring 138. By way of a non-limiting example, one or more (e.g. two) wheels of a vehicle may be coupled to the first shaft 134 and driven for rotation when the first shaft 134 rotates. One or more (e.g. two) wheels of a vehicle may be coupled to the second shaft 136 and driven for rotation when the second shaft 136 rotates. In such an arrangement, a vehicle may be operated in a first mode when the clutch ring 138 is in a first position wherein the clutch ring 138 is not coupled with the second shaft 136, and the vehicle may be operated in a second mode when the clutch ring 138 is in a second position wherein the clutch ring is coupled with the second shaft 136. In the first mode fewer wheels are actively driven in the second mode. For example, the first mode may be a two-wheel drive mode and the second mode may be a four-wheel or all-wheel drive mode.

The biasing component 92 may be installed in a housing 156 of the driveline component 132 in the same manner described above with respect to the differential housing 37. Further, the spring 55 may act on the clutch ring 138 in a similar manner as described with regard to clutch ring 56, with the plunger 54 moving the clutch ring 138 from one position to the other, and the spring 55 moving the clutch ring 138 in the opposite direction. In the example shown, the coil 49 drives the plunger 54 to move the clutch ring 138 to the second position, and the spring 55 acts on the clutch ring 138 to move the clutch ring 138 to the first position.

The spring 55 may be received between an outer surface 158 of a portion of the second shaft 136 (shown as a radially outwardly extending flange 160 including the teeth 154) and an inner surface 162 of the housing 156. The spring 55 may be spaced from both surfaces 158, 162 and arranged so that the spring 55 does not engage either surface 158, 162 in use, if desired. Further, the spring 55 may be arranged to act on the clutch ring 138 closer to a radially outer surface 164 of the clutch ring 138 than the radially inner surface 148 of the clutch ring 138.

With the spring 55 carried by (e.g. fixed to) the retainer 94, the spring 55 may be positioned radially between components without engaging such components, such as is described above. This enables the spring 44 to contact only the retainer 94 and the component being biased/acted upon by the spring, which, in the examples shown, are the clutch ring 56 and clutch ring 138, although other implementations may be used. Without the retainer 94, at least one of the radially inner or outer surfaces of the spring 55 would engage a surface of an adjacent component, and the corresponding engagement surface of the component would need to be suitably dimensioned and smooth to prevent the spring 55 from binding or otherwise being interfered with in use. Further, some springs expand when compressed and this expansion might be interfered with by a component, and/or binding may be more prevalent when the spring expands.

Further, with the retainer 94 connected to one side or end of the spring 55, which may be called an inward side of the spring, the proper orientation of the spring is ensured as the retainer provides an easy to see and determine orientation for the assembly. Some springs may become overlapped or intertwined with another spring in shipping and handling of many springs, and the appearance of a second spring may be difficult to determine causing an incorrect installation of two springs in one device. However, with the retainer 94 connected to one spring 55 the assembly 92 including a retainer 94 and spring 55 is easy to visually determine, and it is easy to determine if more than one retainer and spring combination are present, so installation accuracy is improved. Similarly, some springs are orientation dependent, and the presence of the retainer 94 ensures that the spring 55 is oriented correctly (and not flipped) relative to the clutch ring 56, 138 or other component biased by the spring.

In some prior implementations, to axially position a spring in a desired location within the housing 37, a stop ring separate from the spring, or a washer separate from the spring or both, were separately provided between the spring and a backing surface. Handling and installing multiple components increases the cost and complexity of building a differential or power transfer unit (for example), increases the likelihood of improper installation of the multiple components, and does not radially position the spring as desired (e.g. radially spaced from adjacent components).

Further, in at least some implementations, the spring 55 is positioned radially outboard of the side gear 34 or second shaft 136 rather than between the side gear 34 or second shaft 136 and clutch ring 56, 138. This enables the clutch ring 56, 138 and side gear 34 or second shaft 136 to be formed without a recess to receive the spring between them. This permits these components to be stronger and capable of handling higher forces in use. In at least some implementations, the spring 55 acts on the clutch ring 56, 138 (or other component being biased) closer to the radial outer surface than the radial inner surface.

Thus, an actuator may drive a coupling body, such as the clutch rings 56, 138 described above, in a first direction and a spring 55, 96 of the biasing component 92, 92' may drive the coupling body in an opposite, second direction. In this way, the coupling body may be reliably moved back and forth between at least two positions. In at least some implementations, the actuator includes a coil 49 and a plunger 54 driven by an electromagnetic field generated by the coil 49. Other actuators may be used, including a motor, or a pneumatic or hydraulic actuator, by way of examples. With the biasing component 92 the actuator need only drive the component in one direction, and the spring 55, 96 reliably can drive the component in the opposite direction.

In at least some implementations, the housing 37 of a differential 23 is a first rotating component and a gear 34 of the differential 23 is a second rotating component. The coupling body 56 and biasing component 92 are received within the housing 37 and interact with the housing 37 and differential gear 34 within the housing (e.g. within an interior of the housing). In at least some implementations, the first rotating component is a first shaft 134 of a power transfer unit 132 and the second rotating component 136 is a second shaft of the power transfer unit. Part of both the first shaft 134 and second shaft 136 are received within a housing 156, and the coupling body 138 and biasing component 92 are received within the housing 156 and interact with portions of the shafts 134, 136 within the housing 156.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A driveline component, comprising:
   a housing;
   a first rotating component and a second rotating component;
   an actuator having a body coupled to the housing, the actuator driving the body relative to the first rotating component, and the body being movable between a first position in which the body is not coupled with the first rotating component and a second position in which the body is coupled with the first rotating component; and
   a biasing component having a retainer and a spring, the retainer being in contact with a stop surface that limits movement of the retainer, the spring being fixed to the retainer on one side of the spring and the spring being contacted by the body during at least a portion of the movement of the body to provide a biasing force on the body, and wherein the spring is annular and has a radially inner surface and a radially outer surface, and wherein the radially inner surface and the radially outer surface are not in contact with other components of the driveline component, and the body and biasing component are received within the housing, and the housing includes the stop surface that contacts the retainer to maintain a position of the biasing component.

2. The driveline component of claim 1 wherein the actuator drives the body from the first position to the second position and wherein the spring provides a force on the body tending to move the body from the second position to the first position.

3. The driveline component of claim 1 wherein the stop surface defines part of a groove in which a periphery of the retainer is received.

4. The driveline component of claim 1 wherein the retainer is c-shaped and includes a gap between spaced apart ends, wherein the retainer is flexible to reduce the diameter of the retainer and wherein the retainer is resilient to expand when installed so that a portion of the retainer is radially overlapped by the stop surface.

5. The driveline component of claim 1 wherein the retainer includes a rear face that is flat and arranged to contact the stop surface.

6. The driveline component of claim 5 wherein the retainer includes a front face to which the spring is fixed to prevent movement of the spring relative to the retainer at the point or points of fixation.

7. The driveline component of claim 1 wherein the first rotating component is a is a gear of the differential and the body is a clutch ring that rotates with the housing.

8. The driveline component of claim 1 wherein the body includes teeth and the first rotating component includes complementary teeth that are meshed with the teeth of the body when the body is in the second position.

9. The driveline component of claim 1 wherein the actuator includes a solenoid coil and a plunger driven by a force produced by the coil, and wherein the plunger engages a first face of the body and the spring engages an opposite second face of the body.

10. A driveline component, comprising:
a first rotating component and a second rotating component;
a body coupled to the first rotating component;
a wire coil constructed to produce a magnetic field;
a plunger moved from a first position to a second position by the magnetic field, wherein movement of the plunger from the first position to the second position moves the body relative to the second rotating component from a first position in which the body is not coupled with the second rotating component and a second position in which the body is coupled with the second rotating component; and
a biasing component having a retainer and a spring, the retainer being in contact with a stop surface to limit movement of the retainer, and the spring being fixed to the retainer on one side of the spring and the spring contacting the body during at least a portion of the movement of the body to provide a biasing force on the body.

11. The driveline component of claim 10 wherein the first rotating component is a differential housing and the second rotating component is a gear, and wherein the spring is annular and has a radially inner surface and a radially outer surface, and wherein the radially inner surface and the radially outer surface are not in contact with the differential housing or the gear.

12. The driveline component of claim 10 which also includes a housing, and wherein the first rotating component is a first shaft received at least partially within the housing and the second rotating component is a second shaft received at least partially within the housing, wherein the second shaft does not rotate with the first shaft when the body is in the first position and the second shaft does rotate with the first shaft when the body is in the second position.

13. The driveline component of claim 12 wherein the spring is annular and has a radially inner surface and a radially outer surface, and wherein the radially inner surface and the radially outer surface are not in contact with the housing or the second shaft.

* * * * *